United States Patent [19]
Fox

[11] 3,924,488
[45] Dec. 9, 1975

[54] LIMIT STOP OR FINGER FOR CHAIN OR BELT CONTROL

[75] Inventor: Edward I. Fox, Chicago, Ill.

[73] Assignee: H. W. Crane Company, Maywood, Ill.

[22] Filed: July 15, 1974

[21] Appl. No.: 488,292

[52] U.S. Cl. .............. 74/568 R; 74/37; 200/33 C; 200/61.14
[51] Int. Cl.² ........................................ F16H 53/00
[58] Field of Search ......... 74/142, 138, 150, 568 R, 74/568 M, 568 T, 568 FS, 611, 37; 200/61.12, 61.13, 61.14, 33 C; 403/234, 235, 236, 237

[56] References Cited
UNITED STATES PATENTS

| | | | |
|---|---|---|---|
| 770,901 | 9/1904 | Hall | 403/235 |
| 1,357,763 | 11/1920 | Collins | 403/235 |
| 1,964,909 | 7/1934 | Garity | 200/33 C |
| 2,258,253 | 10/1941 | Levey | 200/33 C |
| 2,382,052 | 8/1945 | Gray | 74/568 X |
| 2,426,690 | 9/1947 | Hughey | 74/37 |
| 2,605,841 | 8/1952 | Overman | 74/37 |
| 2,741,107 | 4/1956 | Garner et al. | 74/568 |
| 2,864,532 | 12/1958 | Gabrielsen | 74/142 |
| 3,406,580 | 10/1968 | Zappia | 74/37 |

FOREIGN PATENTS OR APPLICATIONS 667,524  3/1952  United Kingdom ................. 403/236

Primary Examiner—Samuel Scott
Assistant Examiner—Allan R. Burke
Attorney, Agent, or Firm—John F. McCanna

[57] ABSTRACT

This invention relates to a limit stop or finger used on chain or belt controls for mechanism requiring control actuations. The invention provides a simple, accurate and dependable limit stop or finger for application to a chain or belt control of the type used for imparting control movements in mechanisms by lengthwise movement of the chain or belt. The invention is characterized by an actuator member connected to a chain or belt by a U-shaped clamping member the arms of which clamp to opposite sides of the chain or belt.

1 Claim, 8 Drawing Figures

U.S. Patent  Dec. 9 1975  3,924,488
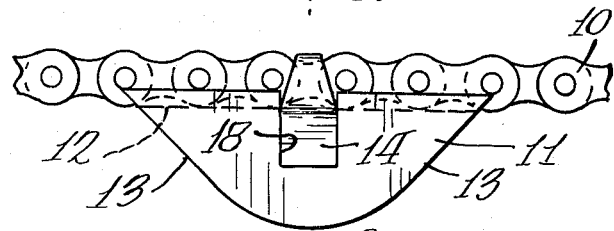
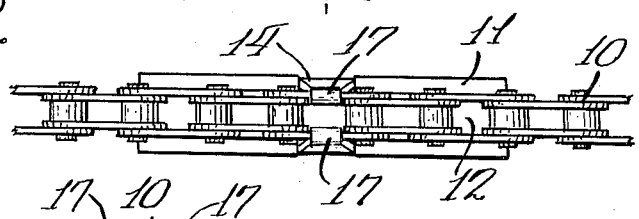
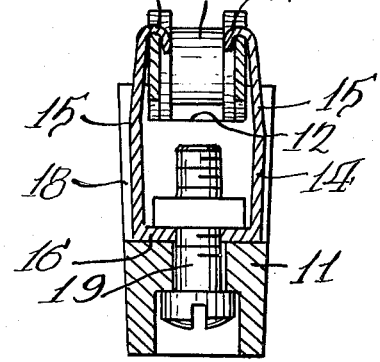
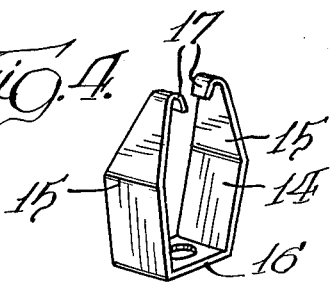
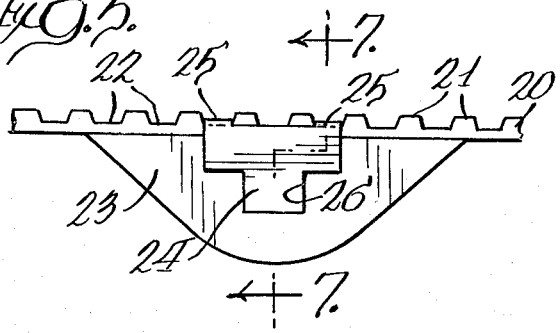
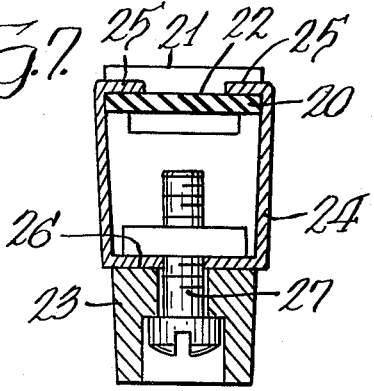
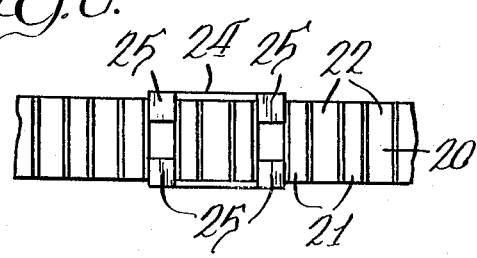
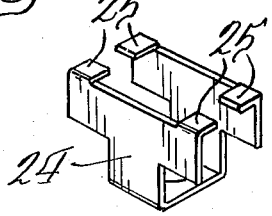

LIMIT STOP OR FINGER FOR CHAIN OR BELT CONTROL

An object of this invention is to provide an accurate and dependable limit stop or finger actuator of novel construction adapted to be applied to a chain or gear belt used for imparting control movements to mechanisms by longitudinal movement of the chain or belt. Such mechanisms are of a large variety, of a type in which the chain or belt has a cycle of movement and the limit stop or finger actuates a control which causes operation of a switch, or gear change, or a function to perform some predetermed operation.

My invention also aims to provide a limit stop or finger which will be clamped to one side of the chain or belt by a novel clamping means which definitely clamps to the chain or belt at a precise position and in a manner to avoid displacement. This is a U-shaped clamping member described more particularly below.

Referring to the drawings:

FIG. 1 is a side view of a limit stop or finger of my invention applied to a control chain;

FIG. 2 is a side view of FIG. 1;

FIG. 3 is a sectional view taken on the section line 3—3 of FIG. 1;

FIG. 4 is a perspective view of the clamping member shown in the preceeding views;

FIG. 5 is a side view of a modified form of the clamping member applied to a gear belt;

FIG. 6 is a top view of FIG. 5;

FIG. 7 is a sectional view taken on the section line 7—7 of FIG. 5; and

FIG. 8 is a perspective view of the clamping member shown in FIGS. 5, 6 and 7.

Referring to the embodiment shown in FIGS. 1 to 4, the metal chain 10 is of a link type such as is customarily used in control operations with mechanisms requiring control actuations at predetermined times. The limit stop or finger 11 has an elongated top which is recessed at 12 to receive the chain. The limit stop or finger is suitably shaped to actuate any control (not shown), as by cam surfaces 13. A clamping member designated generally by 14 serves to connect the limit stop to the chain at any desired link and to clamp the elongated side of the limit stop securely to the chain in a manner to insure against displacement of the limit stop. As shown in FIG. 4 this member 14 is U-shaped, having spaced clamping arms 15 joined by a cross portion 16. The outer end of each arm 15 is shaped to provide a hook 17 which is adapted to hook over the intermediate portion of a chain link, as shown in FIG. 3. The clamping member 14 is seated in a transverse recess 18 in the member 11 and a screw bolt 19 serves to firmly clamp the member 14 to the member 11. The parts are so proportioned that the clamping action also clamps the chain in the recess 12. The screw bolt can be tightened from the bottom to firmly clamp the parts together.

In FIGS. 5 to 8 I have shown a modification in which the limit stop or finger is applied to a gear belt or tape 20 which is used in a manner generally similar to the chain. The belt is of the type having alternating ribs 21 and grooves 22 extending crosswise. In this instance the top of the control actuator member 23 is flat. The U-shaped clamping member 24 is generally similar to the above described clamping member 11, except that each spaced arm is widened lengthwise of the belt and provided with a plurality of fingers 25 adapted to fit into and be clamped in cross recesses 22 in the belt. The member 23 has a transverse recess 26 shaped to receive the clamping member 24. A screw bolt 27 serves to clamp the parts in fixed operative position in the same manner as in the first described embodiment.

These constructions are designed to provide accurate and dependable control actuations. The constructions are economical to manufacture and they serve well the intended functions.

I claim:

1. In combination with an elongated control member having longitudinally spaced elements, an actuator member positioned at one side of said control member and adapted to be located at any of a plurality of positions spaced longitudinally thereon, and means for connecting the actuator member to the control member in any said spaced positions comprising a U-shaped member having spaced arm portions joined by a cross portion, the arm portions shaped to embrace opposite sides of the control member and each arm portion having a hook end adapted to engage between said longitudinally spaced elements, and a screw bolt extending through said cross portion for clamping the connecting means to the actuator member and also clamping said hook ends to the actuator in any located position of the actuator on the control member, the actuator member having an elongated side adapted to be positioned against one side of the control member and recessed intermediate the ends of said elongated side to receive the U-shaped member.

* * * * *